L. S. CHICHESTER.
Grain Weighing Machine.
No. 35,299. Patented May 20, 1862.
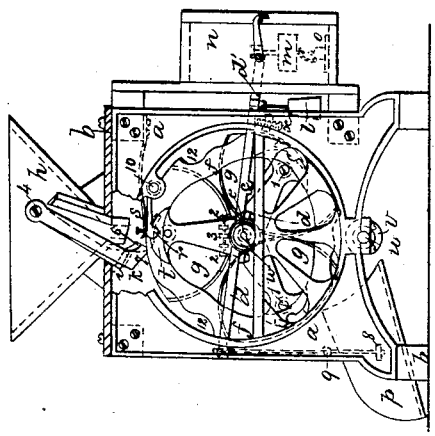
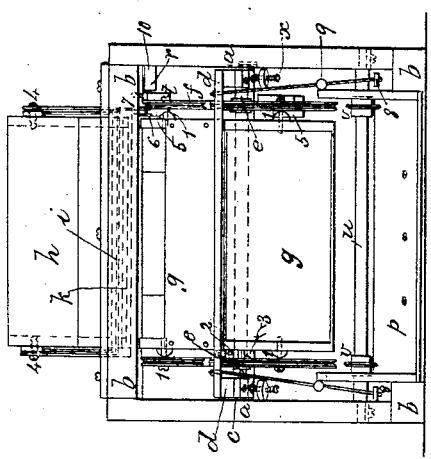
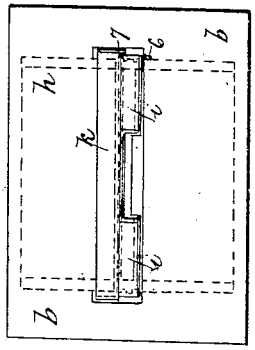
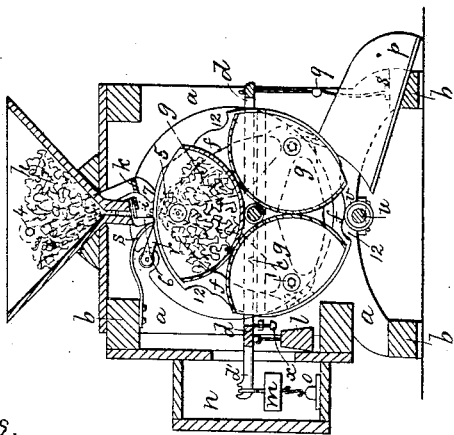
Witnesses.
Lemuel W. Serrell
Thos. Geo. Harold
Inventor.
Lewis S. Chichester

UNITED STATES PATENT OFFICE.

LEWIS S. CHICHESTER, OF NEW YORK, N. Y.

IMPROVEMENT IN GRAIN-WEIGHING MACHINES.

Specification forming part of Letters Patent No. 35,299, dated May 20, 1862.

*To all whom it may concern:*

Be it known that I, LEWIS S. CHICHESTER, of the city and State of New York, have invented, made, and applied to use a certain new and useful Improvement in Grain-Weighing Mechanism; and I do hereby declare that the following is a full, clear, and exact description of the nature and operation of the said invention, reference being had to the annexed drawings, making part of this specification, wherein—

Figure 1 is an elevation of my grain-weigher. Fig. 2 is a side view with part of the frame removed. Fig. 3 is a vertical section with the weighing mechanism at a balance immediately before the supply of grain is cut off, and Fig. 4 is an inverted plan of the hopper and cut-offs.

Similar marks of reference denote the same parts.

The said invention consists in a series of rotary buckets fitted in a peculiar manner and applied on a scale-beam, with such an arrangement of weights that the accuracy of the weighing is insured and the grain is supplied from a hopper or cut off by automatic mechanism.

In the drawings, $a\ a$ are side frames connected by the cross-pieces $b\ b$.

$c\ c$ are fulcra, one on each side frame, $a$, projecting inward and receiving the scale-frame $d$, that is fitted to receive the cross-shaft $e$, which carries the heads $f\ f$. Between these heads $f\ f$ are two or more buckets, $g$. I prefer and have shown three such buckets. Each bucket is hung on gudgeons or centers 1 1 in the heads $f\ f$, and the buckets are allowed a certain amount of swinging or vibrating motion by the set-screws 2 2 on the buckets, the points of which screws are a short distance from the sides of lugs 3 on the heads $f\ f$. By this means the bucket that may be centrally above the shaft $e$ hangs on its centers 1 1 entirely; but the others swing on the centers 1 1 so as to rest on the said screws 2, by the adjusting of which screws the weight of the buckets is so disposed that the parts balance, and the heads $f\ f$ and buckets $g$ will revolve freely without undue weight on either side to arrest the movement or influence the accuracy of the weighing operation.

The grain is supplied through the hopper $h$, and $i$ is the first cut-off, and $k$ is the second cut-off. These cut-offs hang on the centers 4 4, and the first cut-off, $i$, when dropped, almost closes the aperture of the hopper, as seen in Fig. 4, and the second cut-off, when dropped, completely arrests the flow of grain. These cut-offs are actuated by blocks 5 5 5 on the head $f$, one being provided for each of the buckets $g$, and in the partial revolution of the heads and buckets with the shaft $e$ as the same are stopped, as hereinafter detailed, the block 5 strikes against the arms 6 and 7 and removes the cut-offs, and the grain flows quickly into the bucket; and as the scale-beam and buckets descend to the level position shown in Fig. 3 the arm 6 slips off the block 5 and closes the main or first cut-off, $i$, and the grain runs in but a small stream to make an accurate weighing operation, and, the turn of the scale allowing a still further downward movement to the buckets and heads, with the scale-beam, the arm 7 slips off the block 5 and allows the cut-off $k$ to fall and stop the further supply of grain until the next bucket presents itself and the cut-offs $i$ and $k$ are forced back as before.

The weight of the heads $f\ f$, buckets $g\ g$, and other parts is balanced by the weight $l$; and $m$ is a weight that is changeable, so as to weigh more or less in each bucket, and a box, $n$, under lock and key, may inclose the weight $m$, which is on the arm $d'$ of the frame $d$, or said arm $d'$ may be provided with graduations for shifting the weight nearer to or farther from the fulcra $c\ c$.

$o$ is a small weight attached by a chain or otherwise, so that when the buckets are empty the weight $m$ will cause the frame $d$ to incline, as in Fig. 2; but when the weight of grain is almost supplied the scale beam or frame descends to a level, as in Fig. 3. The weight $o$ (still resting on the bottom of the box $n$) prevents further movement of the parts until the small supply of grain running in after the first cut-off overcomes this weight $o$, and the scale-frame and buckets descend. The weight of grain causes the heads $f\ f$, buckets $g\ g\ g$, and shaft $e$ to revolve, bringing an empty bucket up to the top and emptying the full bucket into the chute $p$ or other receptacle.

In order to balance the scale more perfectly, I employ the small weights 8 8, that are just sufficient to compensate for the friction of the arm 6 of the first cut-off against the block 5, and the scale-beam $d$ is relieved from these weights by their coming down on the cross-piece $b$ at the time the arm 6 slips off the block 5, and the small weights 9 9 relieve or counterbalance the friction of the arm 7 of the second cut-off, $k$.

In order to hold the heads $ff$ and buckets $g$ as successively presented, I employ the pawl $r$ on the fulcrum 10; and $s$ is a spring pressing the pawl $r$ to the notch in the projection $t$ on the head $f$, and this spring, by a pin on the pawl through a slot in the spring, prevents the pawl dropping too far down while the buckets are turning. The center 10 being directly over the fulcrum $c$, the movement of the pawl is parallel with the scale-beam, and the bucket descends vertically.

$x\ x$ are screws on which the scale-beam $d$ rests when in the position of Fig. 2.

In revolving the heads $f$ and buckets $g$ by the weight of the grain too much motion might ensue and one or more buckets pass by before the scale-beam would go up so that the pawl $r$ would be fully operative. I therefore employ the cross-shaft $u$ and rollers $v$ beneath the heads $f$, and these are located on the line of the circumference of the said heads when in the position of Fig. 2. The heads $ff$ are notched or formed with cam-shaped depressions 12 12, one of which depressions, being over each roller $v$ when the parts are in a normal position, allows the scale and buckets to descend as the weighing progresses, as aforesaid; but so soon as the heads and buckets turn, the edges of the heads roll upon these rollers $v\ v$, and said parts are forced upward to the normal position of Fig. 2 for commencing the next weighing operation.

The operation of this mechanism as a whole will be understood from the description of the operation of the separate parts, but may be recapitulated as follows: The parts standing in the position of Figs. 1 and 2, the grain runs in freely from the hopper until sufficient to overcome the weight $m$, when the parts assume the position shown in Fig. 3. The descent of the buckets and scale-frame allows the arm 6 to slip off the block 5 and the cut-off $i$ to swing by its own weight and almost close the opening from the hopper; hence the grain runs slowly. The weight $o$ (which was not operative while its chain or cord was loose) now holds the scale-beam and parts steady until the weight of grain, gradually added, lifts said weight $o$, when the scale-beam descends and the cut-off $k$ drops. The direction of the parts in moving throws the full bucket of grain sufficiently forward to cause its weight to revolve the heads and bring up an empty bucket into position for receiving the grain. In the act of so doing the grain is emptied out of the full bucket. The grain is again allowed to run from the hopper by the block 5 coming around and pressing back the arms of the cut-off, and the pawl $r$ holds the parts in place, as before. In this movement the heads $ff$ have turned, and their edges have rolled against the wheels $v$ and raised the buckets, heads, and scale-beam to the normal position of Fig. 2, with the scale-beam at an inclination, after which the weighing proceeds, as before.

The number of revolutions of the shaft $e$ and the consequent amount of grain weighed are to be kept by any suitable counting-machine applied on the scale-beam $d$, as at $w$, Fig. 2. The number of bushels of grain can also be accurately determined in case the sale of grain is effected by the bushel by allowing a certain standard weight per bushel.

What I claim, and desire to secure by Letters Patent, is—

1. A series of buckets set between and revolving with heads on a shaft when said buckets are hung on centers and allowed a limited amount of motion, the same insuring accuracy of weighing, as set forth.

2. The employment of two cut-offs to the hopper, the first shutting off the main supply of grain, while the second regulates the supply necessary for making accurate weight, as specified.

3. The arrangement of mechanism shown, consisting of the arms 6 and 7 and blocks 5, for actuating the first and second cut-offs as the buckets and scale-beam descend, as set forth.

4. The employment of the second or balancing weight, $o$, to act in insuring the accuracy of weight after the main body of grain has passed into the bucket, as set forth.

5. The weights 8 and 9, to counteract the friction of the cut-off arms 6 and 7, in the manner set forth.

6. The pawl $r$, applied and acting in the manner set forth to hold the bucket in place and prevent any variation of the leverage of the same on the scale-beam as the parts descend, as set forth.

7. The employment of the rollers $v\ v$ and heads $ff$, acting in the manner specified, to elevate the buckets and scale-beam to their normal position as each bucket comes to its place, as set forth.

In witness whereof I have hereunto set my signature this 3d day of February, 1862.

LEWIS S. CHICHESTER.

Witnesses:
LEMUEL W. SERRELL,
THOS. GEO. HAROLD.